United States Patent
Thiruchengode Vajravel

(10) Patent No.: US 10,261,933 B2
(45) Date of Patent: Apr. 16, 2019

(54) ENABLING SESSION LEVEL RESTRICTIONS FOR DEVICES HAVING DISJOINT STACKS

(71) Applicant: Wyse Technology L.L.C., Santa Clara, CA (US)

(72) Inventor: Gokul Thiruchengode Vajravel, Bangalore (IN)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 181 days.

(21) Appl. No.: 15/413,027

(22) Filed: Jan. 23, 2017

(65) Prior Publication Data
US 2018/0210856 A1    Jul. 26, 2018

(51) Int. Cl.
*G06F 13/20* (2006.01)
*G06F 13/40* (2006.01)
*G06F 13/42* (2006.01)

(52) U.S. Cl.
CPC ...... *G06F 13/4072* (2013.01); *G06F 13/4282* (2013.01)

(58) Field of Classification Search
CPC .......................... G06F 9/4413; G06F 2201/815
USPC ........................................................ 710/313
See application file for complete search history.

(56) References Cited

U.S. PATENT DOCUMENTS

| | | | |
|---|---|---|---|
| 10,073,806 B2* | 9/2018 | Zhu ..................... | G06F 13/4282 |
| 2003/0140191 A1* | 7/2003 | McGowen .......... | G06F 11/2005 710/302 |
| 2005/0172005 A1* | 8/2005 | Goodwin .............. | G06F 3/0623 709/211 |
| 2007/0276979 A1* | 11/2007 | Liu ........................ | G06F 13/102 710/305 |
| 2008/0061967 A1* | 3/2008 | Corrado ............. | G06K 7/10079 340/539.26 |
| 2012/0246632 A1* | 9/2012 | Lupu ..................... | G06F 9/4413 717/173 |
| 2016/0335221 A1* | 11/2016 | Zhu ......................... | G06F 13/36 |
| 2018/0203635 A1* | 7/2018 | Chen ..................... | G06F 3/0638 |

* cited by examiner

*Primary Examiner* — Hyun Nam
(74) *Attorney, Agent, or Firm* — Kirton McConkie; Brian Tucker

(57) ABSTRACT

Session level restrictions can be implemented for devices having disjoint stacks. When a filter driver is loaded onto a device stack, it can traverse the device stack to locate the root driver in the stack. If the root driver is a redirection virtual bus driver, the filter driver can obtain a session identifier associated with the device. Otherwise, if the root driver is not a redirection virtual bus driver, the filter driver can obtain the container ID for the device. The filter driver can then obtain a list of the devices that are enumerated by the redirection virtual bus driver and determine whether any of the devices in the list have a container ID matching the container ID of the device. If a match is found, the session ID of the matching device can be obtained and employed to implement session level restrictions.

20 Claims, 15 Drawing Sheets

ENABLING SESSION LEVEL RESTRICTIONS FOR DEVICES HAVING DISJOINT STACKS

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1, 2A and 2B and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2A is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2A. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2A. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

The Object Manager Namespace (OMN) stores information on symbolic links created for use by operating system 170, including symbolic links for devices and for applications running on server 104. The Object Manager Namespace generally includes several different namespaces for storing symbolic link information for applications and devices. For example, the Object Manager Namespace can include namespaces such as: a "Global" namespace used to store symbolic link information for devices and applications that are shared by all user sessions running on server 104; various "Local" namespaces, each associated with a user session running on server 104, used to store information for applications used by (and restricted to) the associated user session; and a "Device" namespace used to store device object names of devices and virtual devices accessible by server 104. A "Global" namespace may be referred to as a global namespace. A "Local" namespace may be referred to as a local namespace. A "Device" namespace may be referred to as a device namespace.

As described herein, symbolic links can be stored in a global namespace or a local namespace. Symbolic links stored in a global namespace may be available to the entire system (i.e., to all user sessions running on server 104), while symbolic links stored in a local namespace may only be seen and accessed by the session for which they are created. For example, "\\GLOBAL??\c:" may be a symbolic link stored in a global namespace. "\Device\HarddiskVolume1" may be a device object name stored in a device namespace. A symbolic link "\\GLOBAL??\c:" may be pointing to a device object having a device object name of "\Device\HarddiskVolume1". Because "c:" is a symbolic link in the global namespace directory, such a symbolic link may be accessed by the entire system, including all the users logged in through their respective user sessions. A user application can open "\\GLOBAL??\c:" or just "c:" to access the actual device.

In certain operating systems, such as the Windows operating system, the creation of the symbolic link for a device 240 results in an entry being created in a Global namespace of the Object Manager Namespace. Because the symbolic link is created in the Global namespace, the symbolic link can be accessed from any user session running on server 104. As a result, the device 240 associated with the symbolic link can be accessed from any user session on server 104, and/or from any client terminal having an active user session on server 104.

FIG. 2B illustratively shows a block diagram of a computer system 100 providing local device virtualization. As previously described in relation to FIG. 1, system 100 includes client terminals 102a-102n communicating through network 106 with server 104. As described in relation to FIG. 2A above, each device 240a, 240b can be virtualized on server 104 to provide access to the device from a user session on server 104 through a corresponding virtual device 290a, 290b. For example, when device 240a is connected to client terminal 102a, drivers for device 240a may be loaded in operating system 170 of server 104, device 240a may be virtualized on server 104 as virtual device 290a, and a symbolic link to the device 240a may be created in the Object Manager Namespace of operating system 170. Once the symbolic link is created, a user of client terminal 102a may be able to access device 240a through a user session on server 104. Similarly, when device 240b is connected to client terminal 102b, a symbolic link to the device 240b may be created in the Object Manager Namespace of operating system 170 of server 104. Once the symbolic link is created, a user of client terminal 102b may be able to access device 240b through a user session on server 104.

The symbolic links to the devices 240a, 240b are created in a Global namespace of the Object Manager Namespace of operating system 170. As a result, the symbolic links and associated devices can be accessed from and used by any user session running on server 104. For example, as illustratively shown in FIG. 2B, a user of client terminal 102a having a user session on server 104 may access both device 240a as well as virtual device 240b' from the user session. Similarly, a user of client terminal 102b having a user session on server 104 may access both device 240b as well as virtual device 240a' from the user session. Finally, a user of client terminal 102c having a user session on server 104 may access both virtual device 240a' and 240b' from the user session.

Hence, the device virtualization described in relation to FIGS. 2A and 2B provides unrestricted access to devices 240 connected locally to client terminals 102 from any user session on server 104. As such, a redirected device becomes a local device to the server and can be accessed by all the users' sessions connected to that server. For example a printer or a mass storage device, when redirected by one user connected through a session on the server, will show up as a local device and all the users can read/write the mass storage device and print using the printer.

While the unrestricted access enables users of client terminals 102 to share access to and use of devices 240, the device virtualization does not permit a user to restrict access to a device 240. In this respect, the unrestricted device virtualization does not permit secure or private access to device 240. The device virtualization thus presents security and privacy concerns, as a device 240 may be accessed or used by any number of unauthorized users having user sessions on server 104. In order to address these security and privacy concerns, a device virtualization system may require that a device connected through a session only be accessible in that session.

FIG. 3 is a block diagram of a system 300 that can be employed to enforce session level restrictions to limit access to a redirected USB device. System 300 may include a client 102 in communication with a server 304 over network 106 such as is depicted in FIG. 1. Client 102, including proxy 210, stub driver 220, bus driver 230, and one or more optional device(s) 240, is substantially similar to the client 102 shown in and described in relation to FIG. 2A. Server 304 includes agent 250, virtual bus driver 260, device stack 280 including device objects 281a, 281b, . . . , 281n, device drivers 282a, 282b, . . . , 282n, operating system 170, application 270, and one or more optional virtualized device (s) 290, which function substantially similarly to the corresponding elements of server 104 of FIG. 2A.

Server 304 additionally includes a Device Access Restriction object (DAR object) 180 at the top of device stack 280. A Device Access Restriction driver (DAR driver) 182 creates and attaches DAR object 180 at the top of device stack 280. DAR driver 182 is registered with operating system 170 as the upper filter driver for all selected class(es) of devices for which access restriction is to be made. More particularly, DAR driver 182 associates itself with particular USB classes so that anytime a device in one of the particular classes is connected/redirected, operating system 170 will invoke DAR driver 182's AddDevice routine. When invoked, and possibly based on a determination that the device is in a class that should be session isolated, DAR driver 182 creates DAR object 180 and attaches the DAR object at the top of device stack 280.

Server 304 functions substantially similarly to server 104 in terms of loading drivers and device objects for device 240 on server 304. However, as discussed above, DAR driver 182 is registered as the upper filter driver for all the selected class(es) of devices for which access restriction is to be provided. For example, an image device class which includes webcams may be predetermined to be provided with access restriction. Such device classes may be predetermined by a user. When a device of the class, for which DAR driver 182 is registered, is plugged in, the DAR driver will be loaded and its add device routine may be called by operating system 170. For example, in cases where operating system 170 is a Windows system, a plug-and-play (PNP) component of the Windows Kernel will call an add device routine of DAR driver 182. Inside the add device routine, DAR driver 182 receives the physical device object of device stack 280 as an argument, which is used to verify that the device is a device redirected from client 102 using virtual bus driver 260. This verification is done by traversing device stack 280 downward until the bottom of the stack is reached or virtual bus driver 260 is found.

If virtual bus driver 260 is found in device stack 280, this signifies that the device is redirected from client 102 using the virtual bus driver. If the device is found to be redirected from client 102, DAR driver 182 creates DAR object 180 and attaches it (as the top object) onto device stack 280. However, if the bottom of device stack 280 is reached and virtual bus driver 260 is not found, this signifies that the device stack is not a device that is redirected from client 102, and thus no access restriction is to be provided. If the device is not found to be redirected, then DAR object 180 will not be attached on top of the device stack 280.

Since DAR object 180 is attached to the top of device stack 280, all requests for the redirected device are first received by DAR object 180. Thus, DAR object 180 can accept or reject the requests. For example, DAR object 180 can thus restrict a redirected device to be only accessible from the user session (e.g., a Microsoft windows terminal server session) it is redirected from. In some cases, this could be accomplished by blocking any I/O requests directed to device 240 that originate from any other user session. Additionally, DAR driver 182 can remove the symbolic link to device 240 from the global OMN and place it in a local OMN specific to the user session which will prevent device 240 from being visible from the other user sessions.

As mentioned above, DAR driver 182 determines whether a USB device is a redirected device by traversing the device stack (i.e., the device stack containing the physical device object that is passed in the add device routine). If DAR driver 182 locates virtual bus driver 260 at the bottom of the device stack, it can know that the device is redirected and that session level restrictions should be applied (assuming that policy thus dictates). However, if DAR driver 182 does not locate virtual bus driver 260 during this traversal, it will assume that the device is not redirected (i.e., that it is connected directly to the server) and that session level restrictions should not be applied. In this latter scenario, DAR driver 182 can either unload itself from the device stack or function as a pass-through filter (e.g., by forwarding on IRPs unchanged).

Although this technique for identifying when a device is redirected works in typical scenarios, there are cases where virtual bus driver 260 will not be located at the bottom of the device stack even though the device is redirected. For example, some devices are configured to employ "disjoint device stacks" or simply "disjoint stacks." A disjoint device stack is one in which the device stack is split into two stacks. A common reason for employing a disjoint stack is that it provides a degree of separation between the hardware provider and a service provider. For example, a bank may desire to separate the hardware driver for a pin pad (which would be provided by the hardware vendor) from drivers that implement security features (which would be provided by the bank).

In these disjoint stack environments, it will not be possible to provide session level restrictions using the current techniques because virtual bus driver 260 will not be located at the bottom of the device stack. FIG. 4 provides an example of how a device stack may be structured as a disjoint stack. As shown, device 240 is connected to client terminal 102 and redirected to server 304. In the manner described above, a device stack will be created when virtual bus driver 260 notifies the plug-and-play component of the operating system that device 240 has been connected. However, in contrast to what was described above, it will be assumed that the device stack for device 240 is structured as a disjoint stack consisting of device stack 280a and device stack 280b. For simplicity, the device objects corresponding to the drivers are omitted from device stacks 280a and 280b. However, it should be understood that, other than the fact that a disjoint stack is shown in FIG. 4, FIGS. 3 and 4 depict the same general device stack architecture.

Device stack 280a represents a COM port device and therefore includes COM port driver 400a as well as DAR driver 182 (assuming DAR driver 182 is registered for such devices). However, since device 240 is actually a USB device, device stack 280a also includes a virtual bus driver 400b which is configured to communicate with a USB function driver 400c located in device stack 280b (i.e., virtual bus driver 400b obscures the fact that device 240 is not a COM port device similar to how virtual bus driver 260 obscures the fact that a device is redirected). Virtual bus driver 260 sits below USB function driver 400c. Accordingly, IRPs targeting device 240 will flow down through device stack 280a until reaching virtual bus driver 400b which will then pass the IRPs to USB function driver 400c. USB function driver 400c will then pass the IRPs onto virtual bus driver 260 which will route the IRPs (or, more appropriately, content of the IRPs) to agent 250 for delivery to client terminal 102.

With this disjoint stack architecture, it will appear to DAR driver 182 (or to any other driver loaded on device stack 280a other than virtual bus driver 400b) that virtual bus driver 400b is at the bottom of device 240's stack. Therefore, when DAR driver 182 is loaded on device stack 280a, it will traverse the device stack and determine that virtual bus driver 400b is at the bottom of the stack. Since virtual bus driver 400b is not virtual bus driver 260 (e.g., because DAR driver 182 will not locate the Wyse virtual USB bus driver), DAR driver 182 will assume that device 240 is not a redirected device and will therefore not apply session level restrictions. For this reason, using current techniques, it will not be possible to apply session level restrictions when a device has a disjoint stack.

BRIEF SUMMARY

The present invention extends to methods, systems, and computer program products for enabling session level restrictions for devices having disjoint stacks. When a filter driver is loaded onto a device stack for a particular device, it can traverse the device stack to locate the root driver in the stack. If the root driver is a redirection virtual bus driver, the filter driver can obtain a session identifier associated with the particular device. Otherwise, if the root driver is not a redirection virtual bus driver, the filter driver can obtain the container ID for the particular device. The filter driver can then obtain a list of the devices that are enumerated by the redirection virtual bus driver and determine whether any of the devices in the list have a container ID matching the container ID of the particular device. If a match is found, a session ID associated with the matching device can be obtained and employed to implement session level restrictions. On the other hand, if a match is not found, the filter driver can forego implementing session level restrictions.

In one embodiment, the present invention is implemented by a filter driver as a method for determining when a device is redirected. In response to a filter driver being loaded on a device stack that pertains to a device, the filter driver can identify a root driver of the device stack. The filter driver can query the root driver for a container ID of the device. The filter driver can also obtain a container ID of each device that is enumerated by a redirection virtual bus driver. The filter driver can determine that the container ID of the device matches the container ID of a particular device that is enumerated by the redirection virtual bus driver, and in response, obtain a session ID associated with the particular device.

In another embodiment, the present invention is implemented as computer storage media storing computer executable instructions which, when executed by one or more processors, implement a filter driver. The filter driver is configured to perform the following: identify a root driver of a device stack on which the filter driver is loaded, the device stack pertaining to a device; determine whether the root driver is a redirection virtual bus driver such that when it is determined that the root driver is not the redirection virtual bus driver, the filter driver obtains, from the root driver, a container ID of the device and compares the container ID of the device to a container ID of each device enumerated by the redirection virtual bus driver; and when the container ID of the device matches the container ID of a particular device enumerated by the redirection virtual bus driver, the filter driver implements session level restrictions using a session ID associated with the particular device.

In another embodiment, the present invention is implemented by a filter driver as a method for determining whether to implement session level restrictions. In response to being loaded on a device stack that has been created on a server in response to a first device being redirected to the server, the filter driver identifies a root driver of the device stack. The filter driver then queries the root driver for a container ID of the first device. The filter driver also obtains a list of devices enumerated by a virtual bus driver and compares the container ID of the first device to container IDs of the devices in the list. Upon determining that the container ID of the first device matches the container ID of a particular device in the list, the filter driver obtains a session ID associated with the particular device and employs the session ID to implement session level restrictions.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "redirection virtual bus driver" should be construed as a virtual bus driver that is configured to implement device redirection. Virtual bus driver 260 is an example of a redirection virtual bus driver. The term "root driver" should be construed as the driver (or corresponding device object) that is at the bottom of a device stack from the perspective of other drivers in the stack. Conventionally, the root driver is the first driver loaded on the device stack. When a device is redirected and does not have a disjoint stack, a redirection virtual bus driver should be the root driver. Similarly, when a device is locally connected and does not have a disjoint stack, the USB bus driver would typically be the root driver. In contrast, when a device has a disjoint stack, a "non-redirection" virtual bus driver will be the root driver of the device stack forming the upper portion of the disjoint stack (i.e. the root driver of the device stack on which a filter driver such as DAR driver 182 is loaded).

In accordance with embodiments of the present invention, a filter driver can determine whether a device is redirected using the container ID of the device. In some embodiments, the filter driver can make this determination when the root driver of the device stack on which it is loaded is not a redirection virtual bus driver. In contrast, when the root driver is a redirection virtual bus driver, the filter driver can directly obtain the session ID of the device for purposes of implementing session level restrictions.

Figure 1:
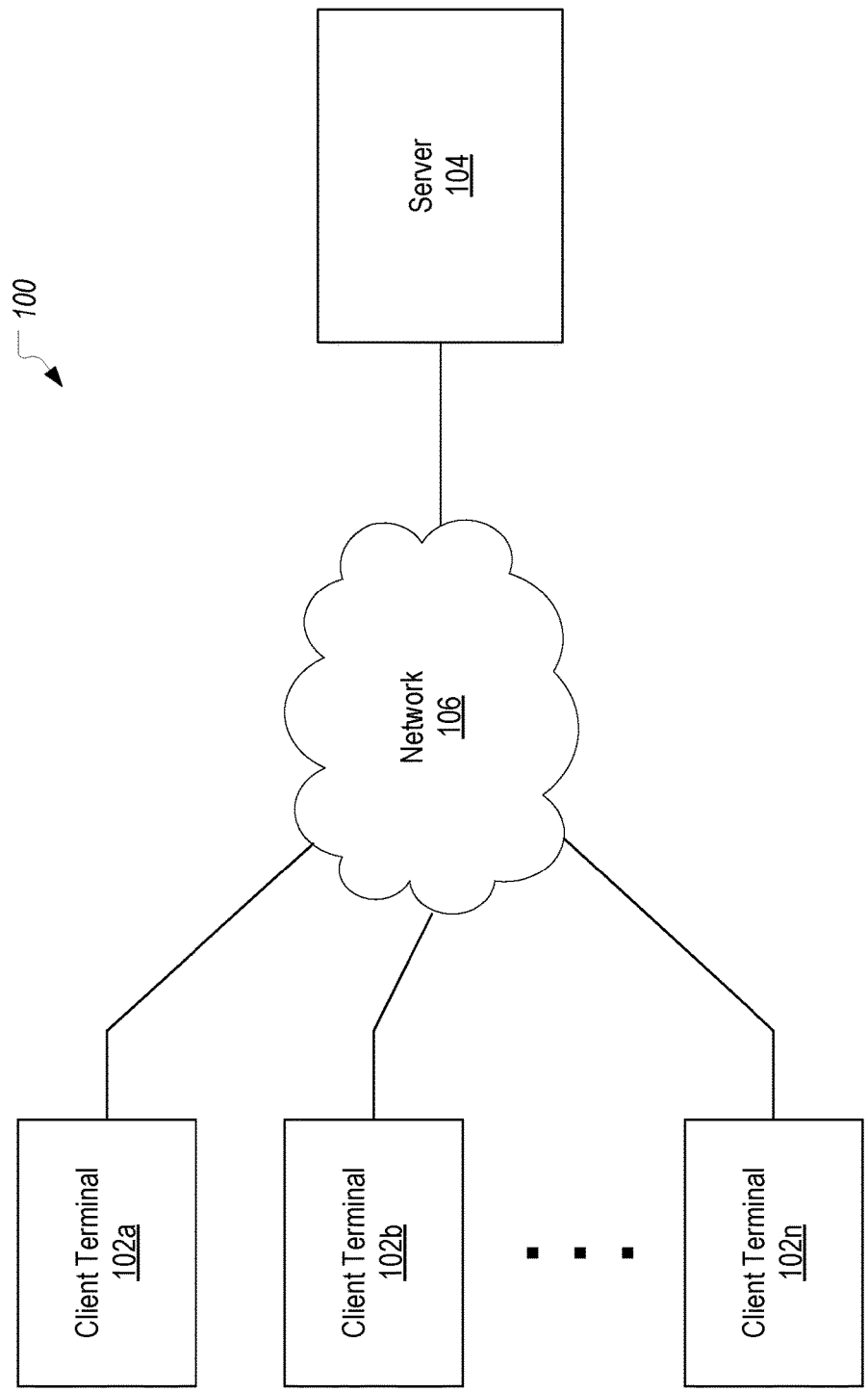
FIG. 1 illustrates an example computing environment in which the present invention can be implemented.
Figure 2A:
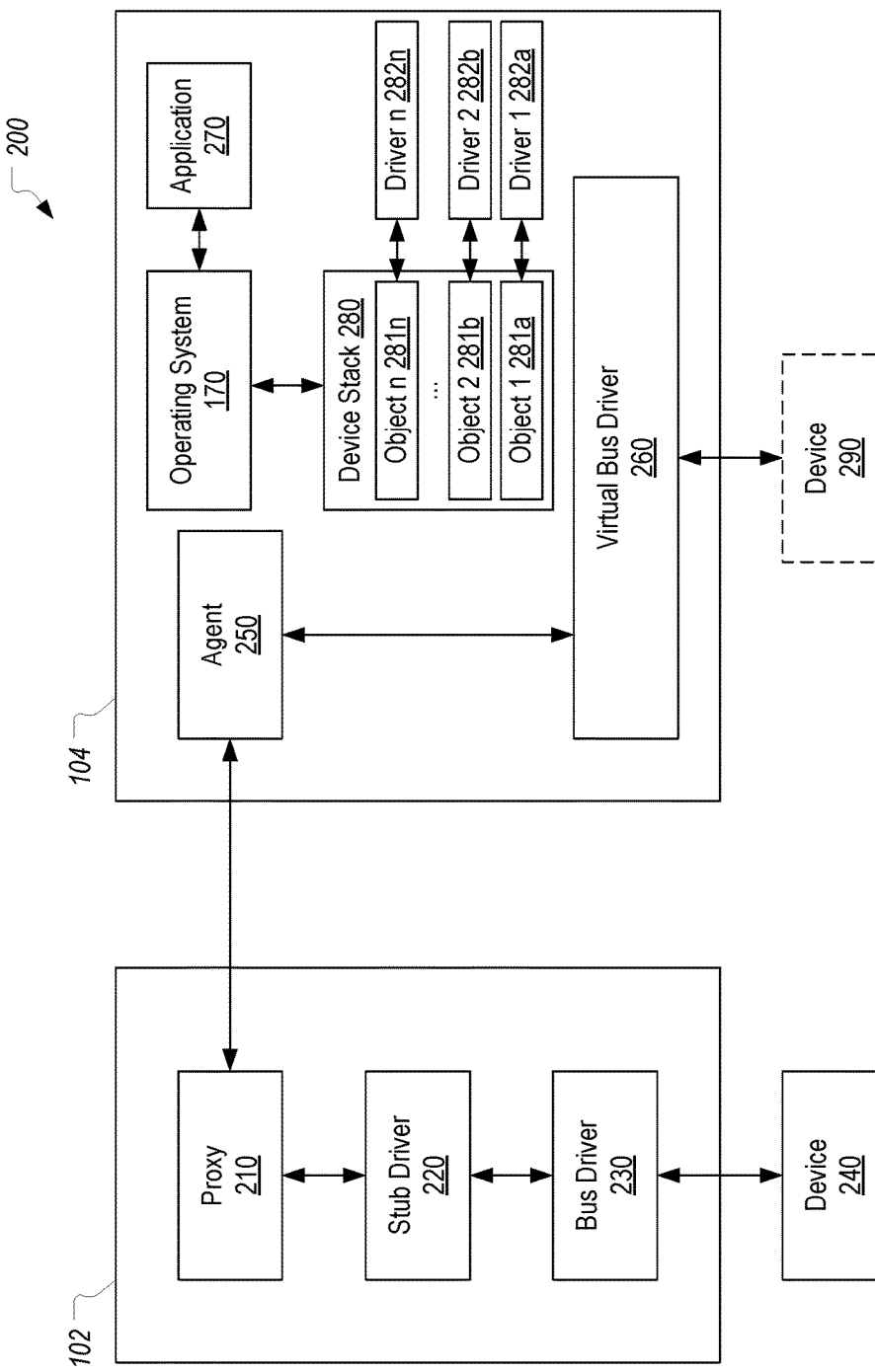
FIG. 2A illustrates how a USB device can be redirected from a client terminal to a server.
Figure 2B:
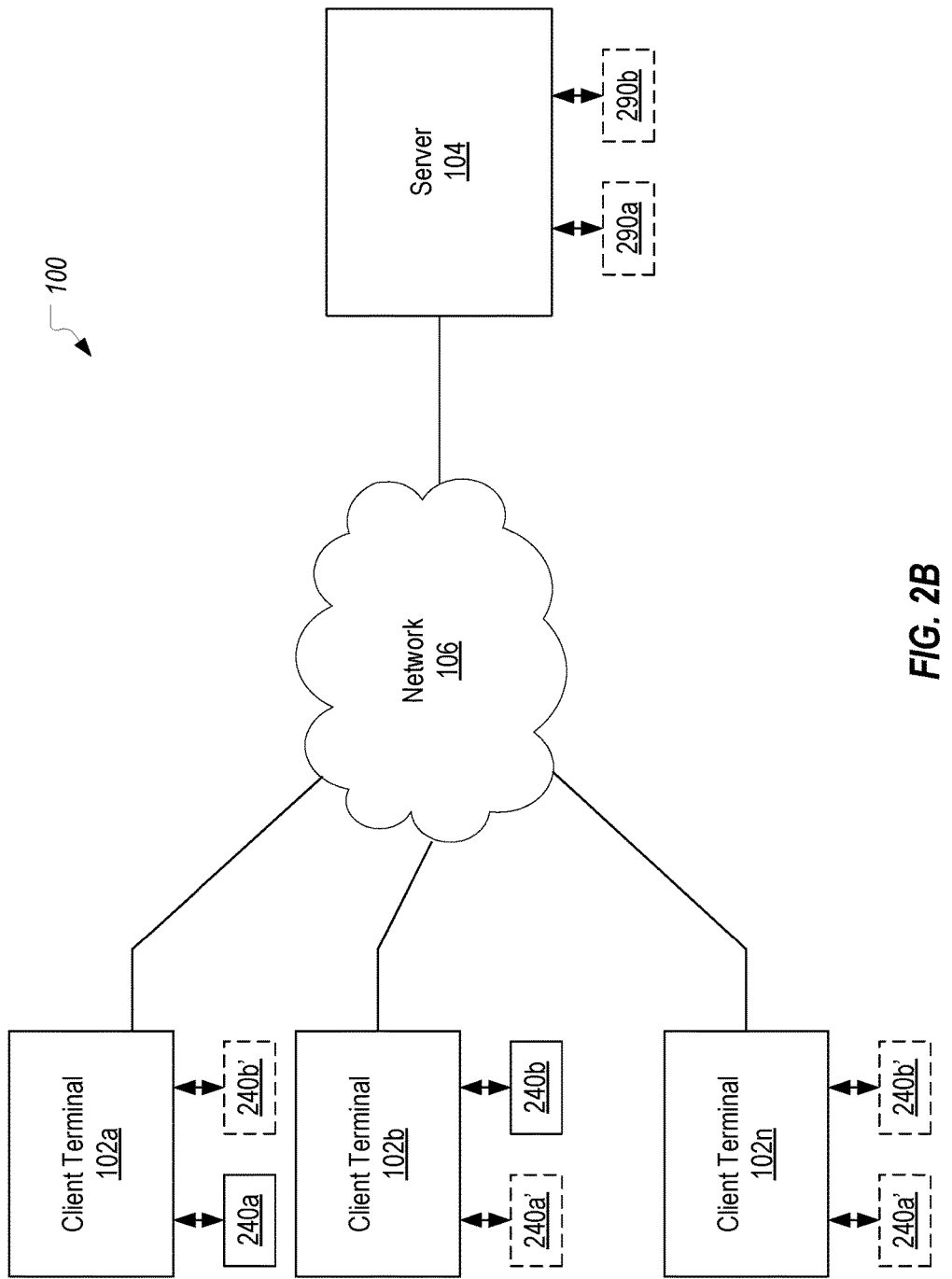
FIG. 2B illustrates how redirecting the USB device to the server can make the device accessible to any remote session established with the server.
Figure 3:
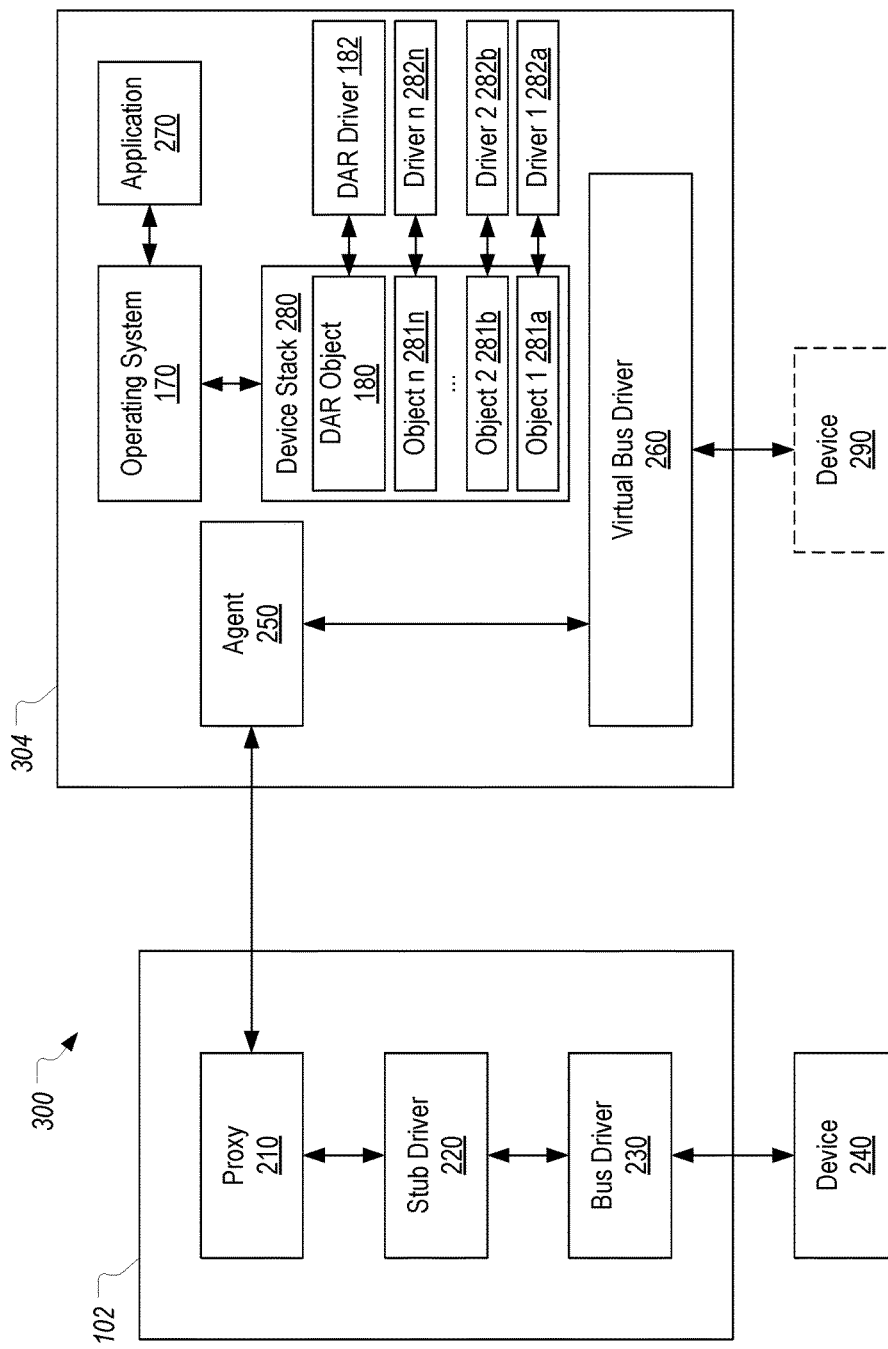
FIG. 3 illustrates how access to a redirected USB device can be restricted to the session over which the redirection occurs.
Figure 4:
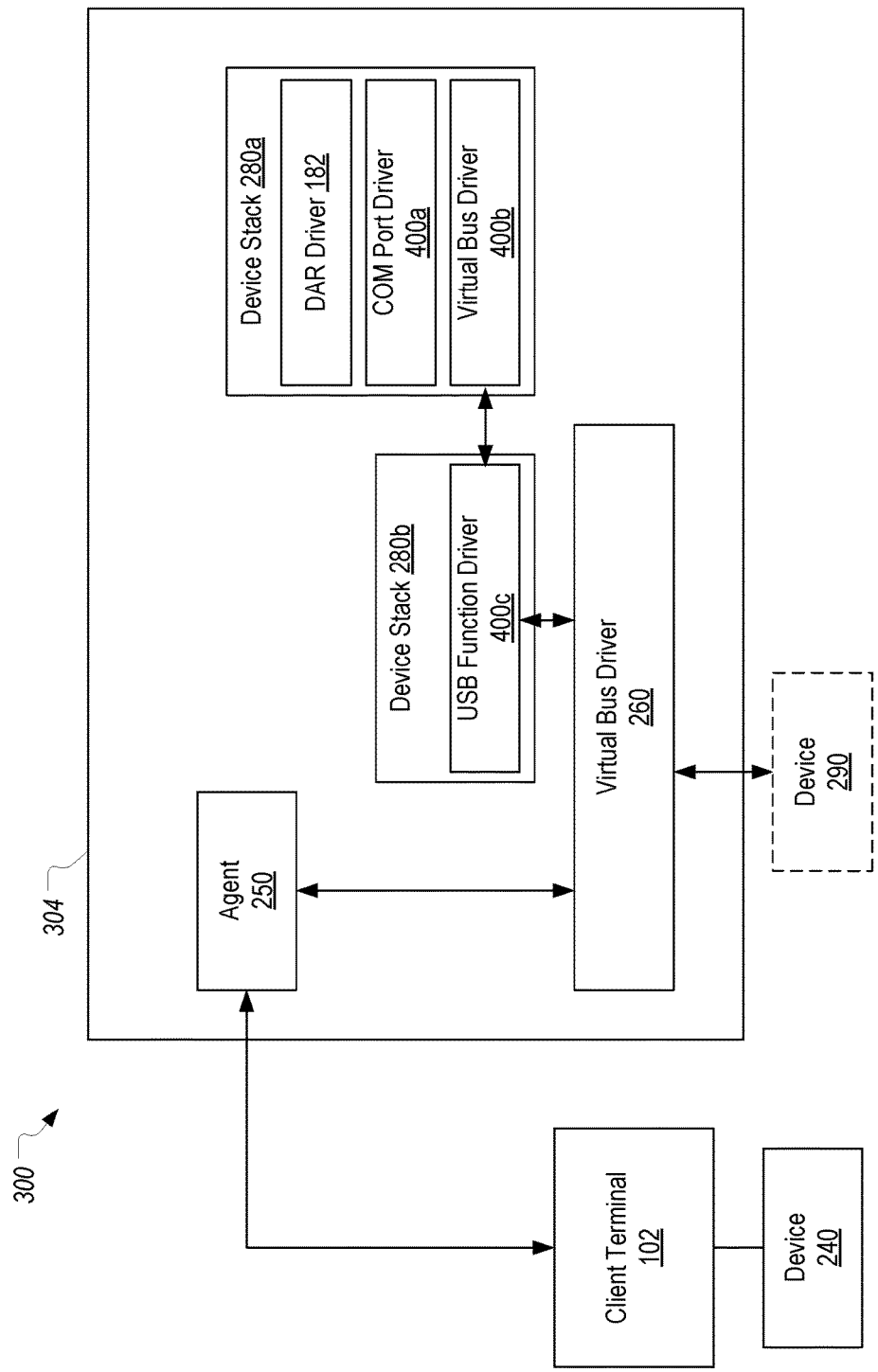
FIG. 4 illustrates an example of how a device can have a disjoint stack.

FIGS. 5A-5H provide an example of how a filter driver—DAR driver 582—can determine that a device is redirected even when the device has a disjoint stack. For ease of illustration, FIG. 5 is the same as FIG. 4 except that DAR driver 582 is loaded on device stack 280*a*. Accordingly, the present invention can be implemented by a filter driver in a way that is agnostic to any remote display protocol used between client terminal 102 and server 304, that requires no modification to the client-side components and that is substantially transparent to operating system 170.

Figure 5A:
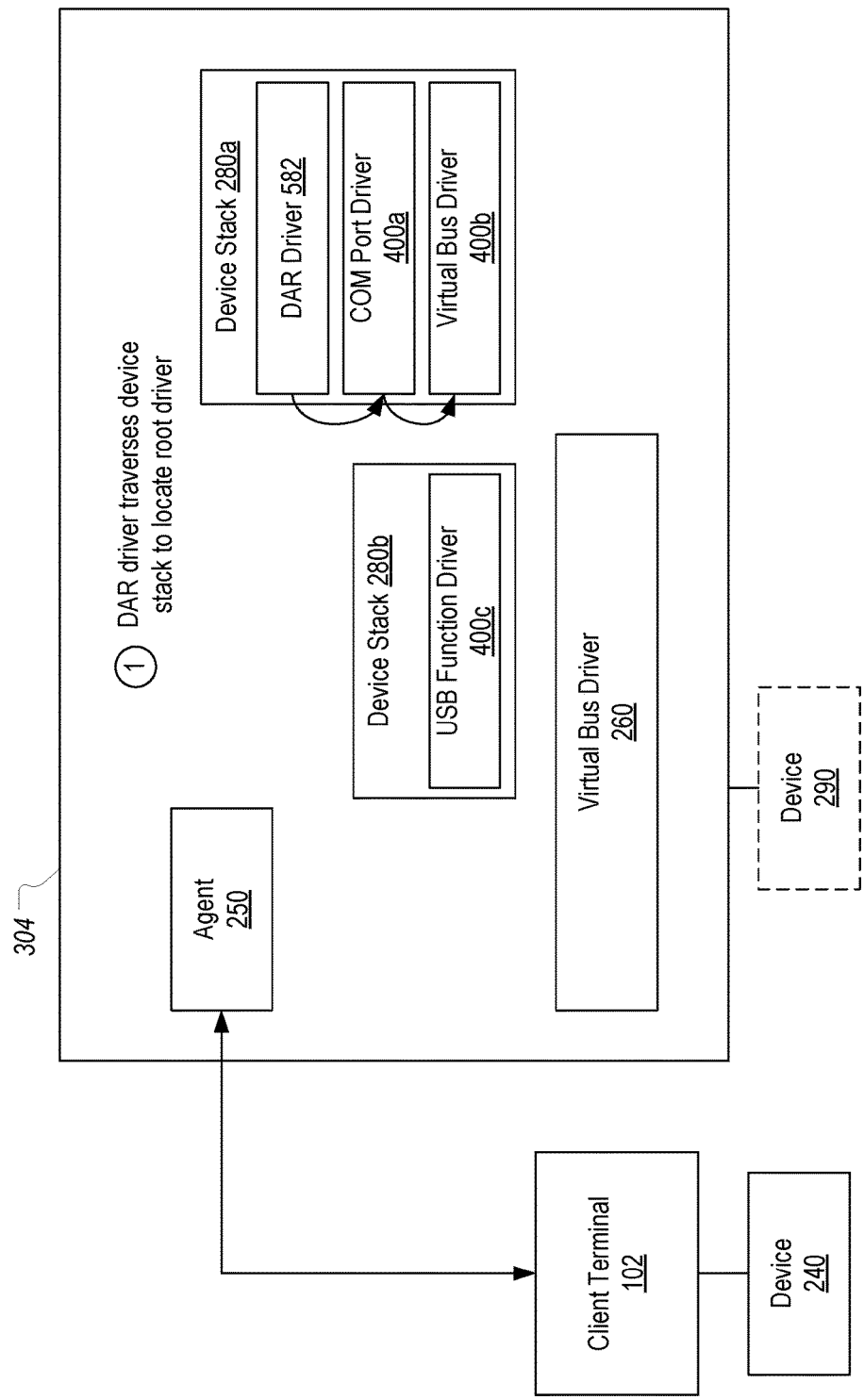
FIGS. 5A-5H illustrate how a filter driver can determine whether to implement session level restrictions in accordance with embodiments of the present invention.
Figure 5B:
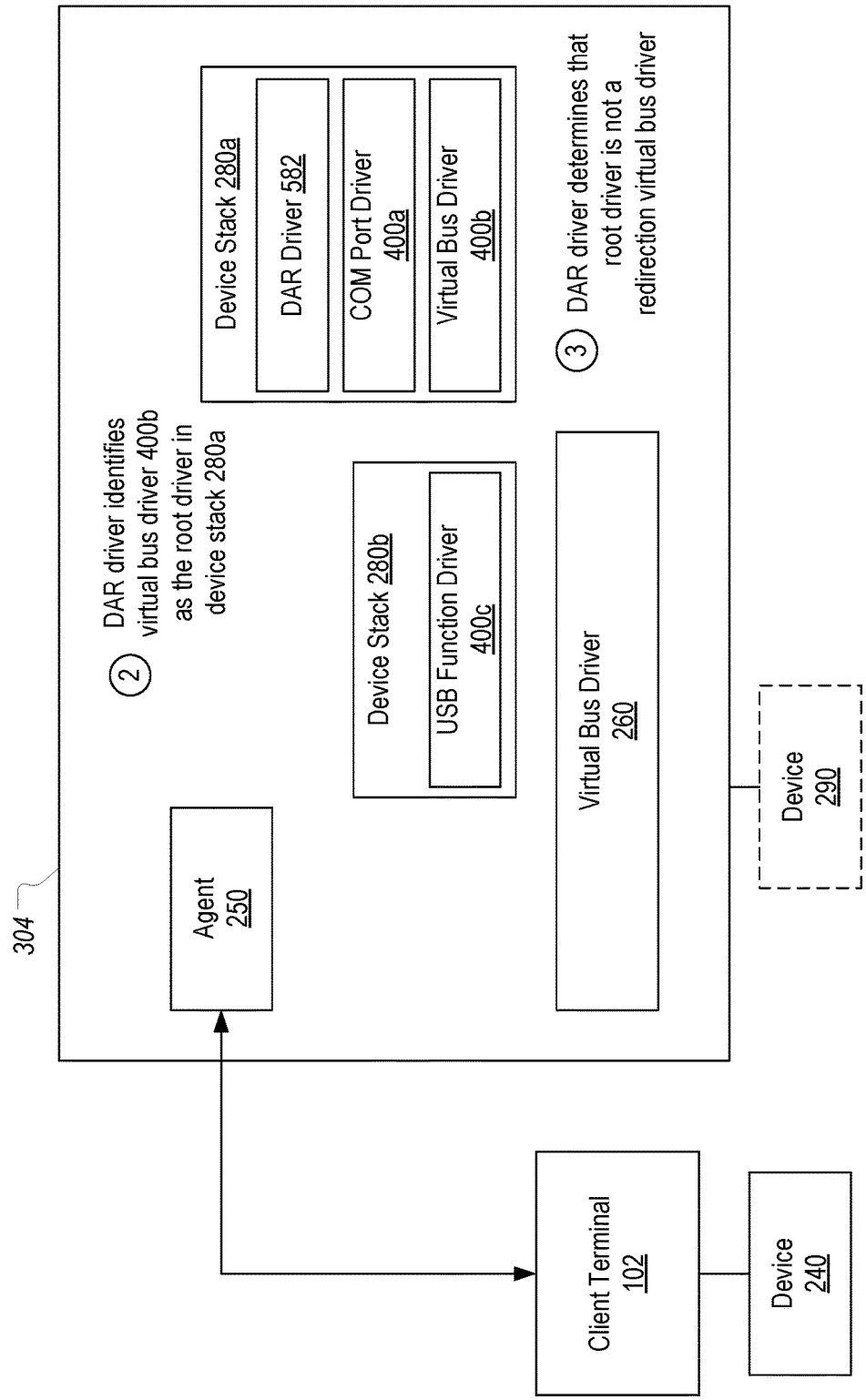
Figure 5C:
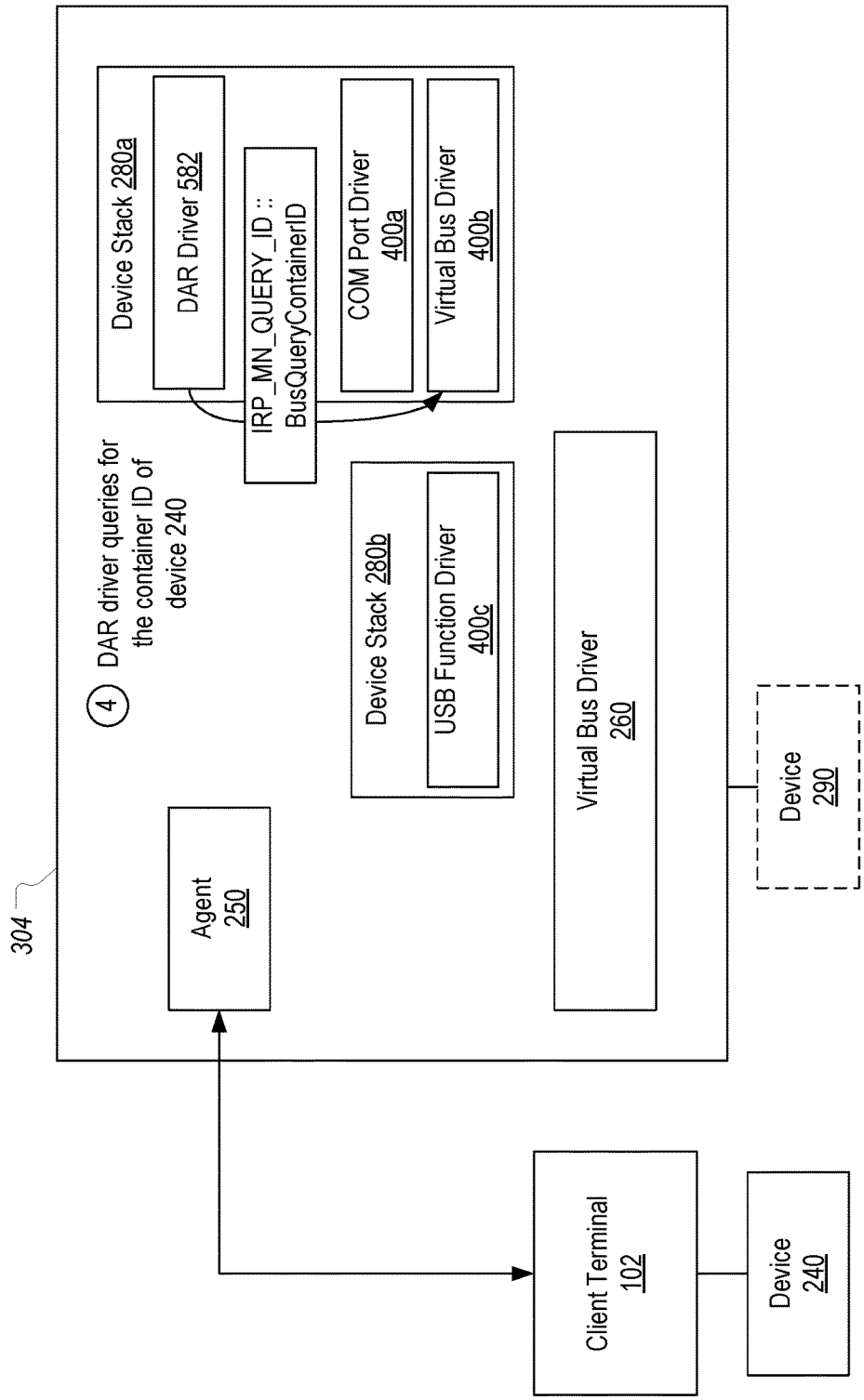
Figure 5D:
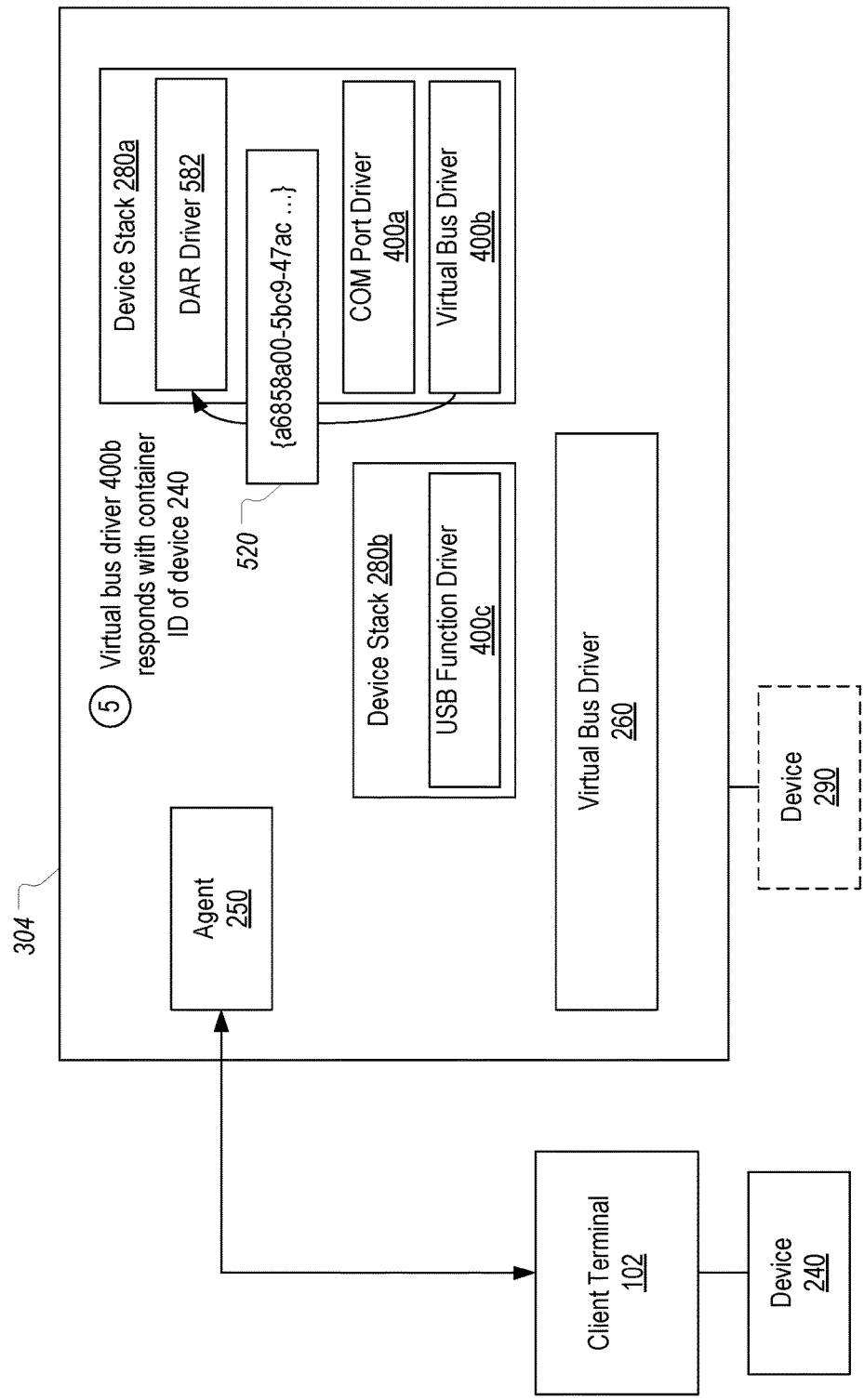

As shown in FIG. 5A, it is assumed that device 240 has been connected to client terminal 102 and redirected to server 304 resulting in the loading of a disjoint stack consisting of device stacks 280*a* and 280*b* on server 304. As was described in the background, DAR driver 582 can be registered with operating system 170 so that it is loaded onto device stack 280*a* as an upper level filter driver.

In step 1, DAR driver 582 traverses device stack 280*a* to locate the root driver in the stack. As one of skill in the art would understand how to traverse a device stack, this process will not be described. During this traversal, DAR driver 582 will eventually reach the root driver in device stack 280*a*. In this example, and as indicated as step 2 in FIG. 5B, DAR driver 582 will determine that virtual bus driver 400*b* is the root driver in device stack 280*a*. Next, in step 3, DAR driver 582 can determine whether the root driver is a redirection virtual bus driver. For example, DAR driver 582 can be configured to recognize virtual bus driver 260 (which may be wvusbbus.sys provided as part of the Wyse TCX platform) as the redirection virtual bus driver on server 304. Therefore, because virtual bus driver 400*b*, rather than virtual bus driver 260, is the root driver of device stack 280*a*, DAR driver 582 can determine that the root driver is not a redirection virtual bus driver.

If the root driver of device stack 280*a* had been virtual bus driver 260, DAR driver 582 could have simply requested the session ID of (or associated with) device 240 (which virtual bus driver 260 maintains) and then used this session ID to implement session level restrictions as was described in the background. However, this technique will not work in this example due to the disjoint stack. To address this issue, when DAR driver 582 determines that the root driver is not a redirection virtual bus driver, it can query the container ID of the device. For example, as shown as step 4 in FIG. 5C, DAR driver 582 can generate the IRP: "IRP_MN_QUERY__ID::BusQueryContainerID."

In current versions of Windows, the plug and play manager uses the container ID (which is a GUID) to group one or more device nodes that originated from and belong to each instance of a particular physical device. The intended purpose of the container ID is to allow the functions of composite devices to be grouped. However, all devices, including those that are not composite devices, should typically be assigned a container ID. In the present example, a container ID therefore will have been assigned to device 240/290. Also, bus drivers are required to handle requests for BusQueryContainerID for their child physical device objects. As a result, when DAR driver 582 issues the IRP_MN_QUERY_ID::BusQueryContainerID, virtual bus driver 400*b* will respond with the container ID 520 that has been assigned to device 240 as shown in step 5 of FIG. 5D.

Figure 5E:
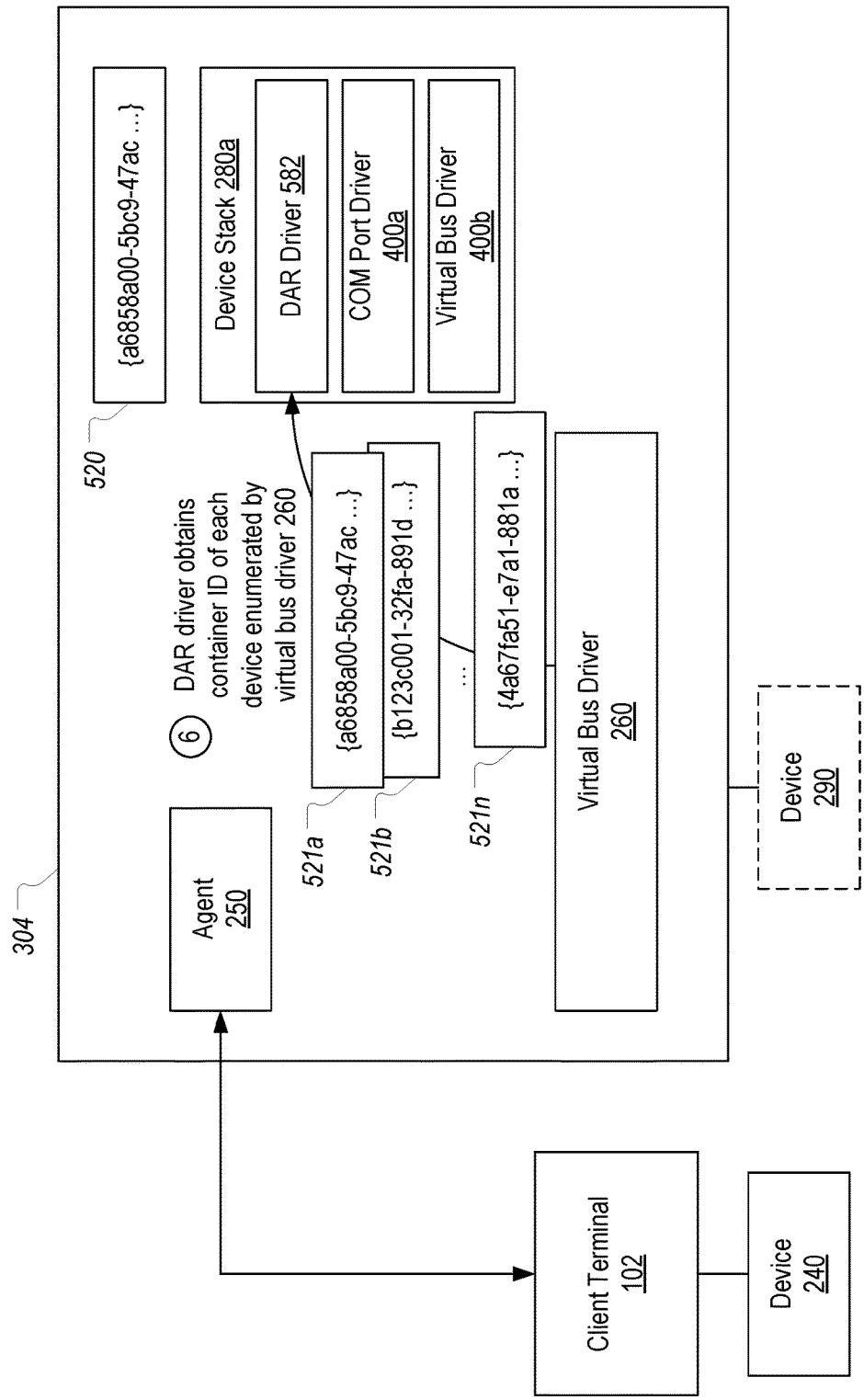

In step 6 as shown in FIG. 5E, DAR driver 582 can obtain a list of devices enumerated by virtual bus driver 260. For example, DAR driver 582 could obtain a handle to virtual bus driver 260's child list object and then employ the WdfChildListBeginIteration, WdfChildListRetrieveNextDevice, and WdfChildListEndIteration methods to obtain information about each device that is being redirected to server 304. Importantly, this information can include (or can be employed to obtained) the container ID of each device enumerated by virtual bus driver 260 such as container IDs 521*a*-521*n* as shown in FIG. 5E.

Figure 5F:
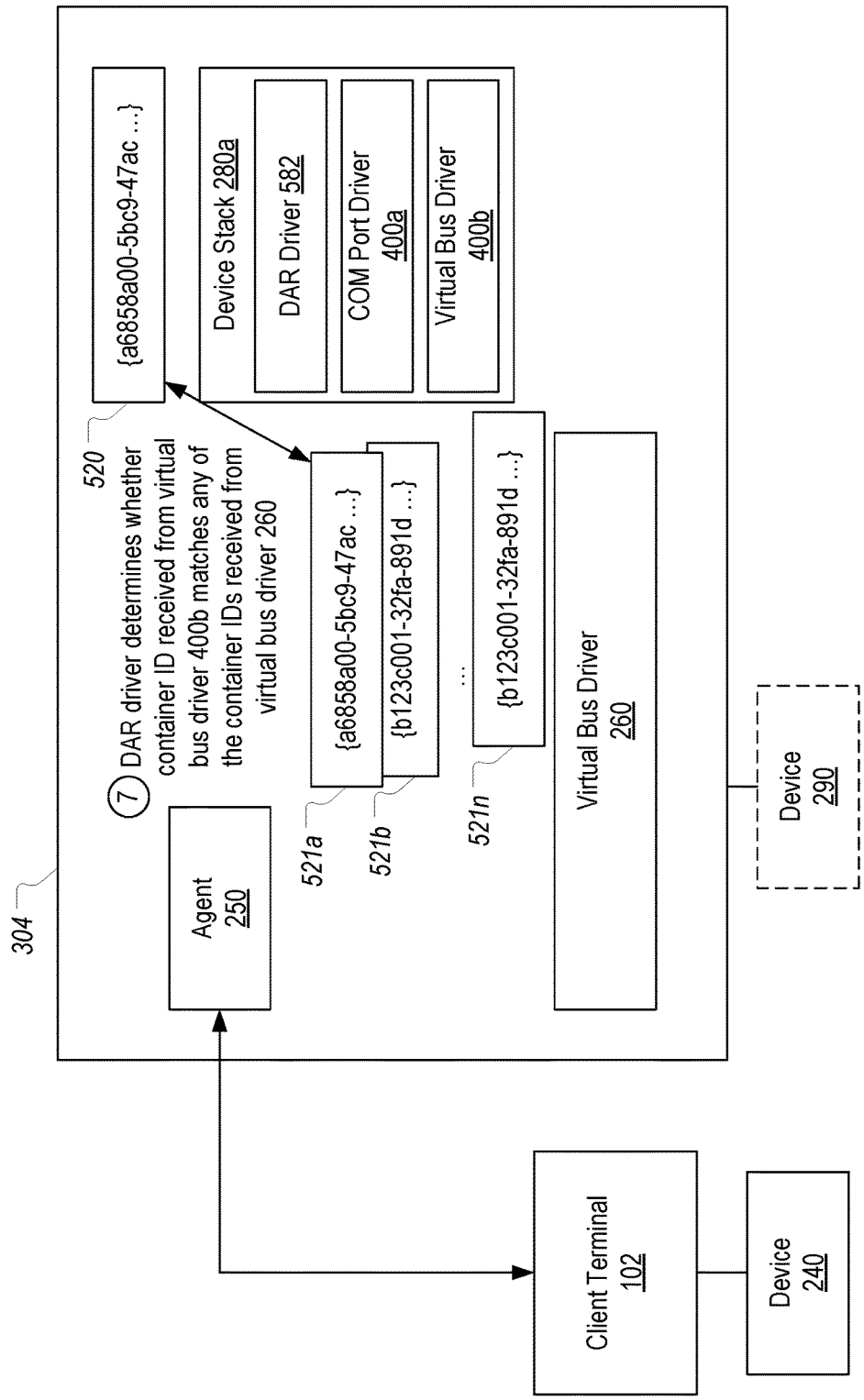
Figure 5G:
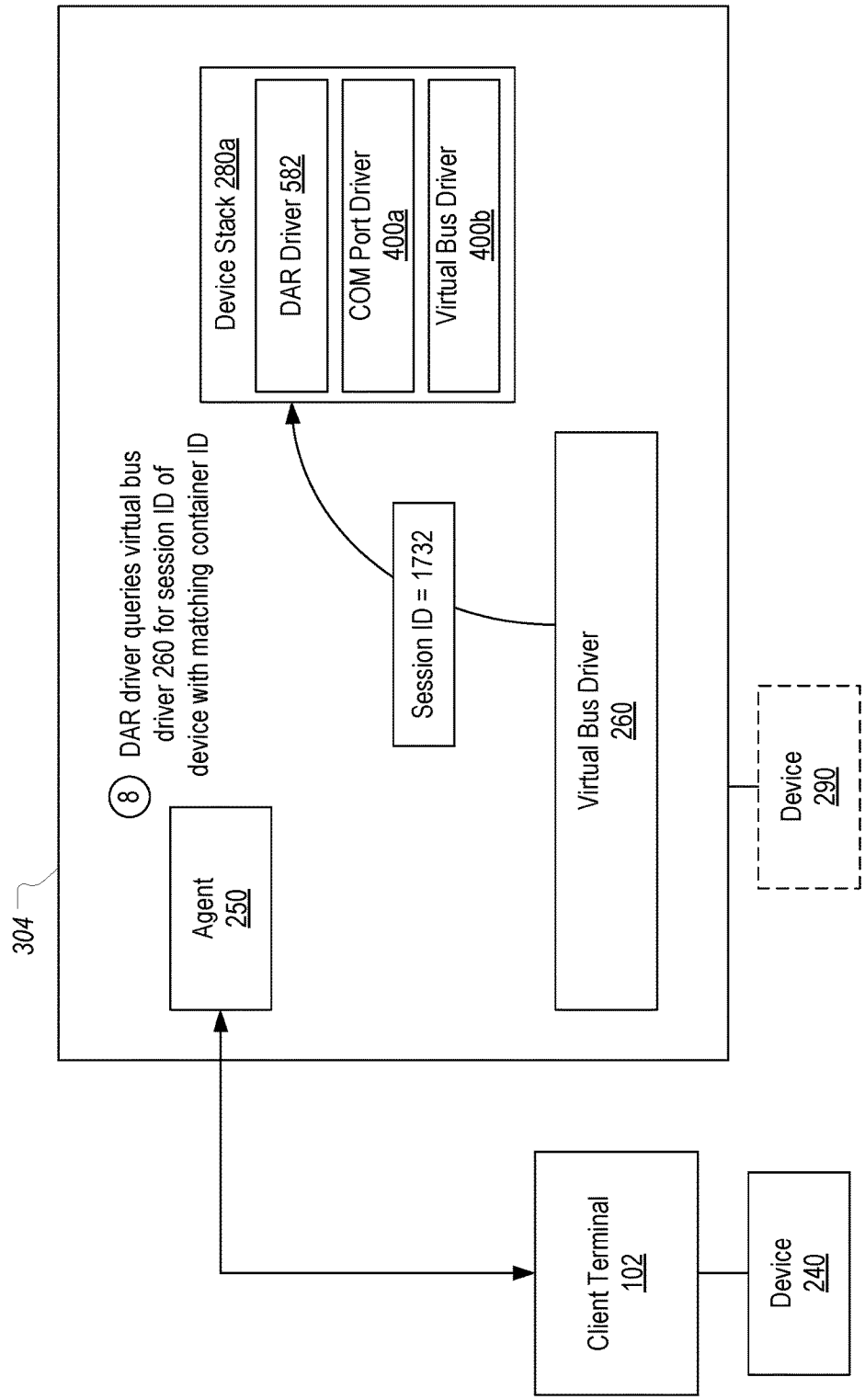

Once DAR driver 582 knows the container ID (520) reported by virtual bus driver 400*b* (or more generally, the container ID reported by the root driver of the device stack on which DAR driver 582 is loaded) and knows the container IDs (521*a*-521*n*) for each device enumerated by virtual bus driver 260 (or, in other words, each device that is being redirected to server 304 using the virtual desktop infrastructure of which DAR driver 582 forms a part), DAR driver 582 can determine whether the container ID reported by virtual bus driver 400*b* matches a container ID of a device enumerated by virtual bus driver 260 as represented as step 7 in FIG. 5F. In this example, because device 240 is redirected, DAR driver 582 will locate matching container ID 521*a*. However, if DAR driver 582 had instead failed to find a matching container ID, DAR driver 582 could have determined that device stack 280*a* pertains to a device that is not being redirected and could therefore either unload itself from device stack 280*a* or simply act as a pass through filter driver.

When a matching container ID is found, DAR driver 582 can know that device stack 280*a* pertains to a redirected device and, assuming policy thus dictates, session level restrictions should be applied. To accomplish this, in step 8 shown in FIG. 5G, DAR driver 582 can query virtual bus driver 260 for the session ID associated with the device having the matching container ID. In this example, it is assumed that client terminal's remote session has a session ID of 1732.

Figure 5H:
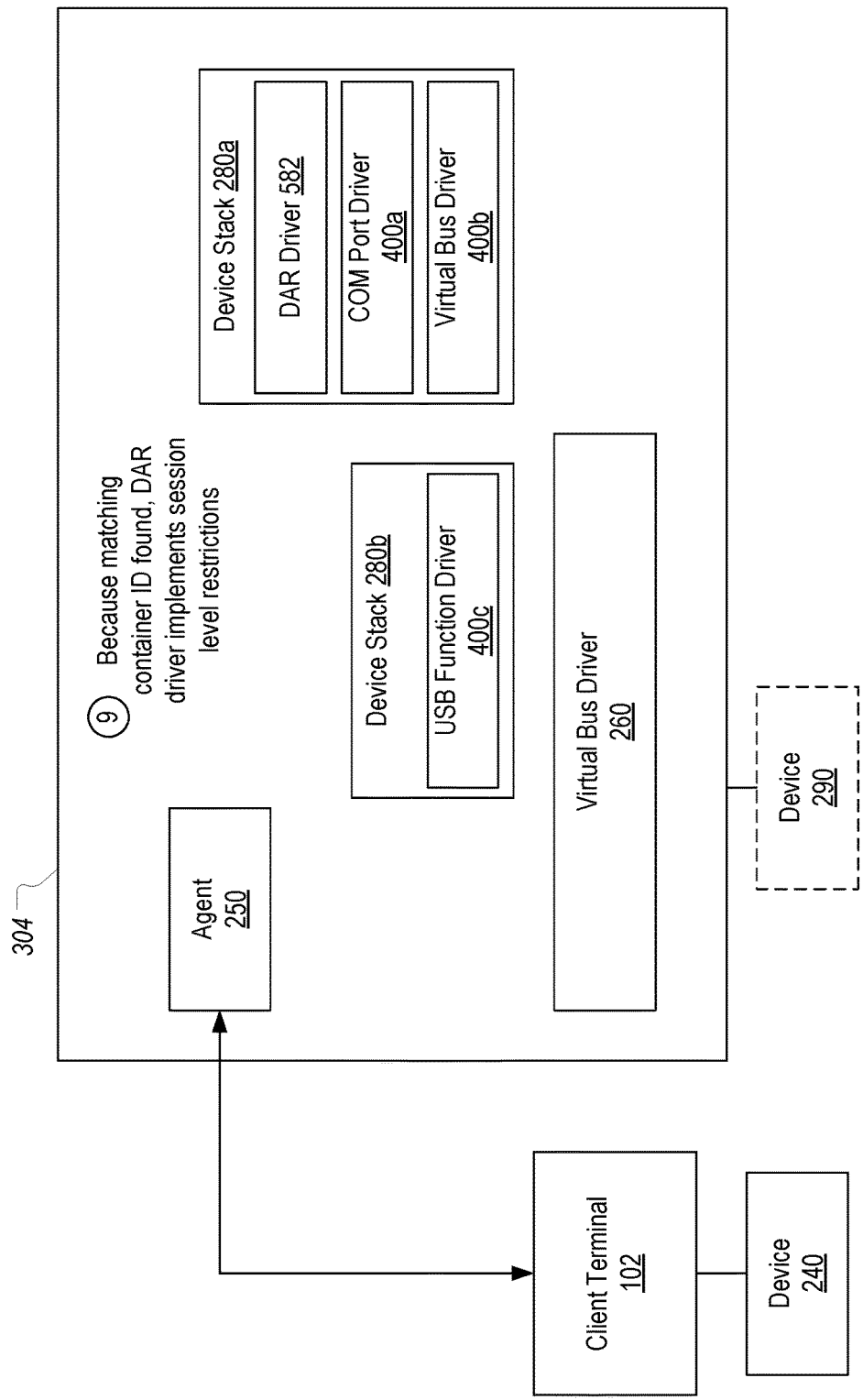

Finally, in step 9 as shown in FIG. 5H, DAR driver 582 can commence implemented session level restrictions. As described in the background, this can be accomplished by blocking any IRP that is not associated with session ID 1732 and/or by moving symbolic links pertaining to device 240 to a local OMN for this session.

Figure 6:
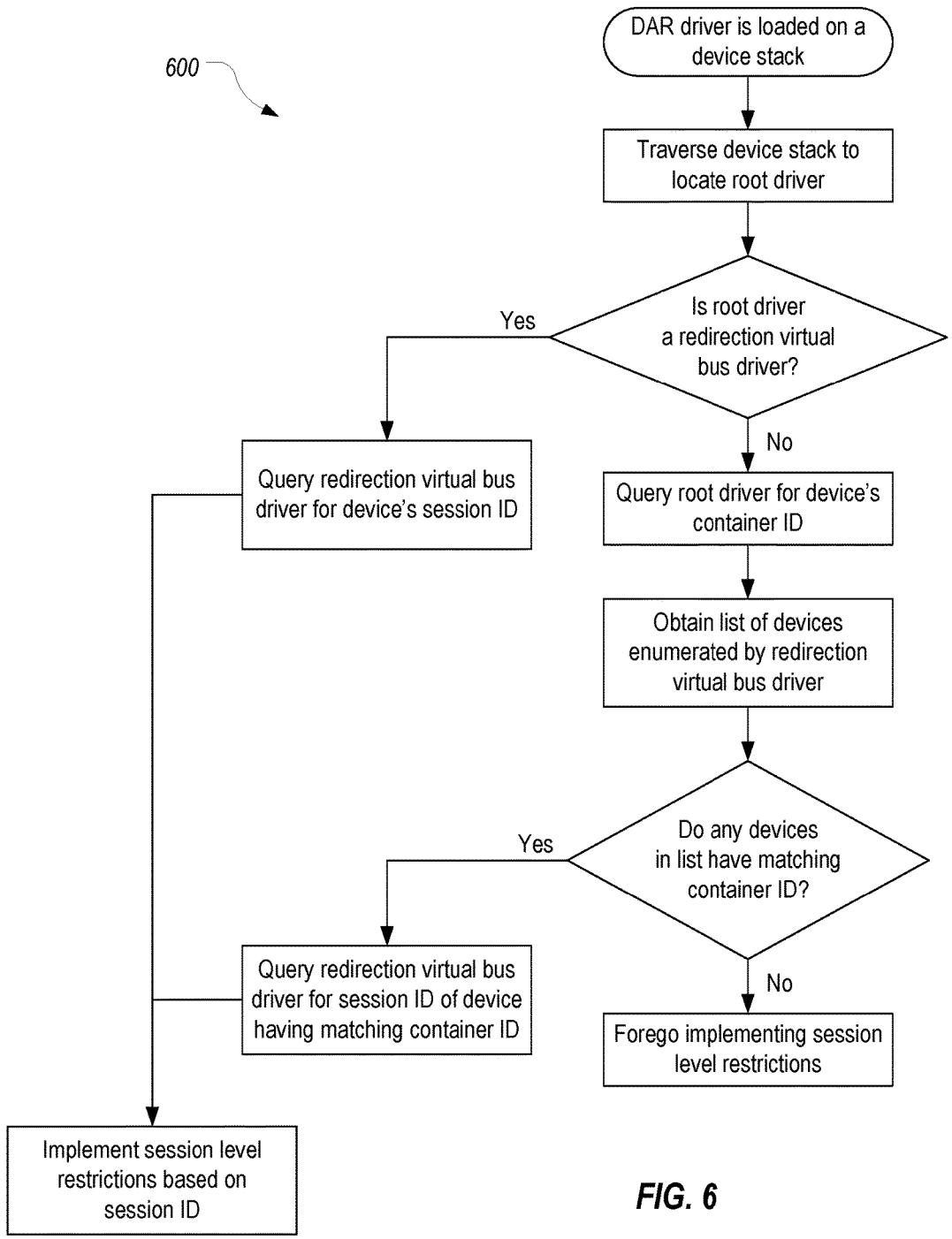
FIG. 6 provides a flowchart of the process performed by the filter driver.

FIG. 6 provides a flowchart 600 for the above described process. The process can begin when a filter driver (e.g., DAR driver 582) is loaded on a device stack. Once loaded, the filter driver can traverse the device stack to locate the root driver and then determine whether the root driver is a redirection virtual bus driver. If so, the filter driver can query the root driver (i.e., the redirection virtual bus driver) for the session ID of the device to which the device stack pertains and commence implementing session level restrictions using the session ID. However, if the root driver is not a redirection virtual bus driver (implying that the device may not be redirected or may employ a disjoint stack), the filter driver can query the root driver for the container ID of the device to which the device stack pertains. The filter driver can also obtain a list of devices enumerated by the redirection virtual bus driver and determine whether the container ID of any device in the list matches the container ID that was received from the root driver. If there is a match, the filter driver can query the redirection virtual bus driver for the session ID of the device having the matching container ID and implement session level restrictions using that session ID. However, if there is not a match, the filter driver can forego implementing session level restrictions (e.g., by unloading itself from the device stack or functioning as a pass through filter).

In summary, the present invention provides a way for a filter driver to identify that a device is redirected even when the device may have a disjoint stack. As a result, devices that employ disjoint stacks can be used in virtual desktop infrastructure environments without the concern that they would be accessible from any session on the server. This ability is provided in a manner that is entirely transparent to the client terminals and that is independent of the remote display protocol.

Figure 7:
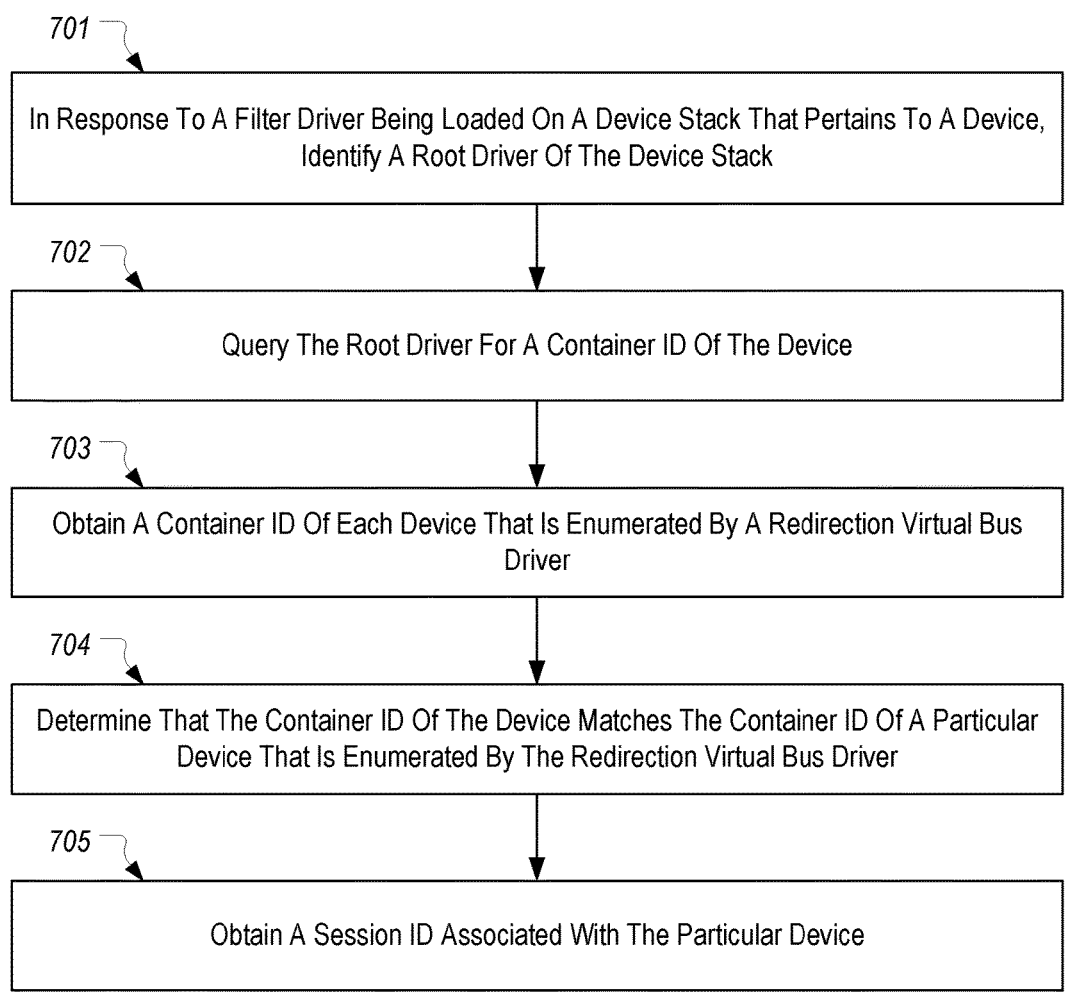
FIG. 7 illustrates a flowchart of an example method for determining when a device is redirected.

FIG. 7 provides a flowchart of an example method 700 for determining when a device is redirected. Method 700 can be performed by a filter driver such as DAR driver 582.

Method 700 includes an act 701 of, in response to a filter driver being loaded on a device stack that pertains to a device, identifying a root driver of the device stack. For example, when DAR driver 582 is loaded on device stack 280*a*, it can identify that virtual bus driver 400*b* is the root driver of device stack 280*a*.

Method 700 includes an act 702 of querying the root driver for a container ID of the device. For example, DAR driver 582 can query virtual bus driver 400b for the container ID that has been assigned to device 240/290.

Method 700 includes an act 703 of obtaining a container ID of each device that is enumerated by a redirection virtual bus driver. For example, DAR driver 582 can obtain the child list of virtual bus driver 260 and obtain the container ID of each device in the child list.

Method 700 includes an act 704 of determining that the container ID of the device matches the container ID of a particular device that is enumerated by the redirection virtual bus driver. For example, DAR driver 582 can determine that the container ID of a device in virtual bus driver 260's list matches the container ID obtained from virtual bus driver 400b.

Method 700 includes an act 705 of obtaining a session ID associated with the particular device. For example, DAR driver 582 can obtain the session ID associated with the device in the child list that has the matching container ID.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a filter driver in a virtual desktop infrastructure environment, for determining when a device is redirected, the method comprising:
   in response to a filter driver being loaded on a device stack that pertains to a device, identifying a root driver of the device stack;
   querying the root driver for a container ID of the device;
   obtaining a container ID of each device that is enumerated by a redirection virtual bus driver;
   determining that the container ID of the device matches the container ID of a particular device that is enumerated by the redirection virtual bus driver; and
   obtaining a session ID associated with the particular device.

2. The method of claim 1, further comprising:
   employing the session ID to implement session level restrictions.

3. The method of claim 2, wherein implementing session level restrictions comprises blocking I/O requests that are not associated with the session ID.

4. The method of claim 2, wherein implementing session level restrictions comprises removing one or more symbolic links to the particular device from a global object manager namespace and adding the one or more symbolic links to a local object manager namespace associated with the session ID.

5. The method of claim 1, wherein the root driver is queried for the container ID of the device in response to determining that the root driver is not the redirection virtual bus driver.

6. The method of claim 1, wherein obtaining a container ID of each device that is enumerated by a redirection virtual bus driver comprises accessing a child list of the redirection virtual bus driver.

7. The method of claim 1, wherein the root driver is a virtual bus driver that implements a disjoint device stack.

8. The method of claim 1, wherein the session ID of the particular device is obtained from the redirection virtual bus driver.

9. One or more computer storage media storing computer executable instructions which, when executed by one or more processors, implement a filter driver, the filter driver being configured to perform the following:
   identify a root driver of a device stack on which the filter driver is loaded, the device stack pertaining to a device;
   determine whether the root driver is a redirection virtual bus driver such that when it is determined that the root driver is not the redirection virtual bus driver, the filter driver obtains, from the root driver, a container ID of the device and compares the container ID of the device to a container ID of each device enumerated by the redirection virtual bus driver; and
   when the container ID of the device matches the container ID of a particular device enumerated by the redirection virtual bus driver, the filter driver implements session level restrictions using a session ID associated with the particular device.

10. The computer storage media of claim 9, wherein identifying the root driver comprises traversing the device stack until reaching a bottommost driver in the device stack.

11. The computer storage media of claim 9, wherein the filter driver obtains the session ID of the particular device from the redirection virtual bus driver.

12. The computer storage media of claim 9, wherein the filter driver is further configured to perform the following:
when it is determined that the root driver is the redirection virtual bus driver, the filter driver obtains, from the redirection virtual bus driver, a session ID of the device and implements session level restrictions using the session ID obtained from the redirection virtual bus driver.

13. The computer storage media of claim 9, wherein the filter driver is further configured to perform the following:
when the container ID of the device does not match the container ID of any device enumerated by the redirection virtual bus driver, the filter driver foregoes implementing session level restrictions.

14. The computer storage media of claim 9, wherein comparing the container ID of the device to a container ID of each device enumerated by the redirection virtual bus driver comprises obtaining a list of the devices enumerated by the redirection virtual bus driver and employing the list to obtain the container ID of each of the devices in the list.

15. The computer storage media of claim 9, wherein implementing session level restrictions comprises one or more of:
blocking I/O requests that are not associated with the session ID; or
removing symbolic links to the particular device from a global object manager namespace.

16. A method, performed by a filter driver, for determining whether to implement session level restrictions, the method comprising:
in response to being loaded on a device stack that has been created on a server in response to a first device being redirected to the server, identifying a root driver of the device stack;
querying the root driver for a container ID of the first device;
obtaining a list of devices enumerated by a virtual bus driver;
comparing the container ID of the first device to container IDs of the devices in the list; and
upon determining that the container ID of the first device matches the container ID of a particular device in the list, obtaining a session ID associated with the particular device and employing the session ID to implement session level restrictions.

17. The method of claim 16, further comprising:
upon determining that the container ID of the first device does not match the container ID of any of the devices in the list, foregoing implementing session level restrictions.

18. The method of claim 16, wherein the root driver is queried for the container ID of the first device after determining that the root driver is not the redirection virtual bus driver.

19. The method of claim 16, wherein implementing session level restrictions comprises blocking I/O requests that are not associated with the session ID.

20. The method of claim 16, wherein the device stack represents a COM port device.

* * * * *